L. W. & A. M. RIGGS.
HYDROAEROPLANE.
APPLICATION FILED JUNE 1, 1916.

1,281,661.

Patented Oct. 15, 1918.
10 SHEETS—SHEET 6.

INVENTORS
LEWIS W. RIGGS
ASHLEY M. RIGGS
BY
ATTORNEY

L. W. & A. M. RIGGS.
HYDROAEROPLANE.
APPLICATION FILED JUNE 1, 1916.

1,281,661.

Patented Oct. 15, 1918.
10 SHEETS—SHEET 7.

INVENTORS
LEWIS W. RIGGS
ASHLEY M. RIGGS
By
ATTORNEY

L. W. & A. M. RIGGS.
HYDROAEROPLANE.
APPLICATION FILED JUNE 1, 1916.

1,281,661.

Patented Oct. 15, 1918.
10 SHEETS—SHEET 8.

INVENTORS
LEWIS W. RIGGS
ASHLEY M. RIGGS
BY
ATTORNEY

L. W. & A. M. RIGGS.
HYDROAEROPLANE.
APPLICATION FILED JUNE 1, 1916.

1,281,661.

Patented Oct. 15, 1918.
10 SHEETS—SHEET 9.

INVENTORS
LEWIS W. RIGGS
ASHLEY M. RIGGS

ATTORNEY

UNITED STATES PATENT OFFICE.

LEWIS W. RIGGS AND ASHLEY M. RIGGS, OF WHEELING, WEST VIRGINIA.

HYDROAEROPLANE.

1,281,661.

Specification of Letters Patent. Patented Oct. 15, 1918.

Application filed June 1, 1916. Serial No. 101,031.

*To all whom it may concern:*

Be it known that we, LEWIS W. RIGGS and ASHLEY M. RIGGS, citizens of the United States of America, and residents of Wheeling, county of Ohio, and State of West Virginia, have invented certain new and useful Improvements in Hydroaeroplanes, of which the following is a specification.

This invention relates to hydro-aeroplanes, and it has for its primary object to provide a dirigible craft which is so constructed as to be capable of carrying relatively heavy loads and which may be readily controlled.

A further object is to provide an aeroplane which is so controllable that it may directly ascend from, or descend to, any selected location; which may ascend or descend in a vertical direction; and which may be stopped and safely remain in a substantially stationary position in midair, or may be stopped and reversed.

A still further object of the invention is to provide a structurally improved craft of the character mentioned providing a plurality of supporting planes and propellers fore and aft which shall render the craft readily controllable.

With these and other important objects in view, the invention resides in the features of construction, arrangement of parts and combinations of elements which will hereinafter be exemplified, reference being had to the accompanying drawings, in which—

Referring to said drawings, in which like designating characters distinguish like parts throughout the several views—

1 indicates a shell-like body which is preferably of torpedo shape, the same constituting an inclosure or car within which the prime mover, associated gearing and main control parts are located and which is designed to receive the load to be transported.

Mounted at a suitable point, as in the forward part of the substantially cylindrical portion of the car 1 is the power plant consisting of a motor 2 of any appropriate character, preferably of a rotary internal combustion type. The rear end of the drive-shaft 3 of said motor is connected by suitable gearing to a longitudinally disposed power transmission shaft 4 which is located in an out-of-the-way position, preferably underneath the floor 5. In the present embodiment the gearing interposed between said engine shaft 3 and said transmission shaft 4 includes a suitably journaled shaft 6 located in alinement with the engine shaft, a clutch 7 whereby said shafts 3 and 6 may be operatively connected, and a sprocket chain 8 connecting sprocket wheels fixed on said shafts 3 and 4, respectively.

A shaft 11 is adapted to be operatively connected to the front end of the engine shaft 3 through the intermediacy of a clutch 12. Said shaft 11 has a bearing in a casing 13 supported upon a suitable base or pedestal 14 and carries a bevel gear 15 on its end within said casing, said bevel gear being in mesh with a similar gear 16 carried on the lower end of an upright shaft 17 which is journaled in an upright sleeve-like extension 18 of said casing and which carries a bevel gear 19 upon its upper end within a box-like casing 20 supported by said extension 18. Extended transversely through and journaled in said casing 20 is a horizontal shaft 21 incased by and rotatable within a pair of oppositely disposed tubes 22 which have their inner ends disposed in seated relation to said casing and which extend outward through and project a suitable distance beyond the walls of the car body 1. Rotary motion is communicated to said shaft 21 through a bevel gear 23 fixed thereon and located in operative relation to bevel gear 19.

Figure 1:
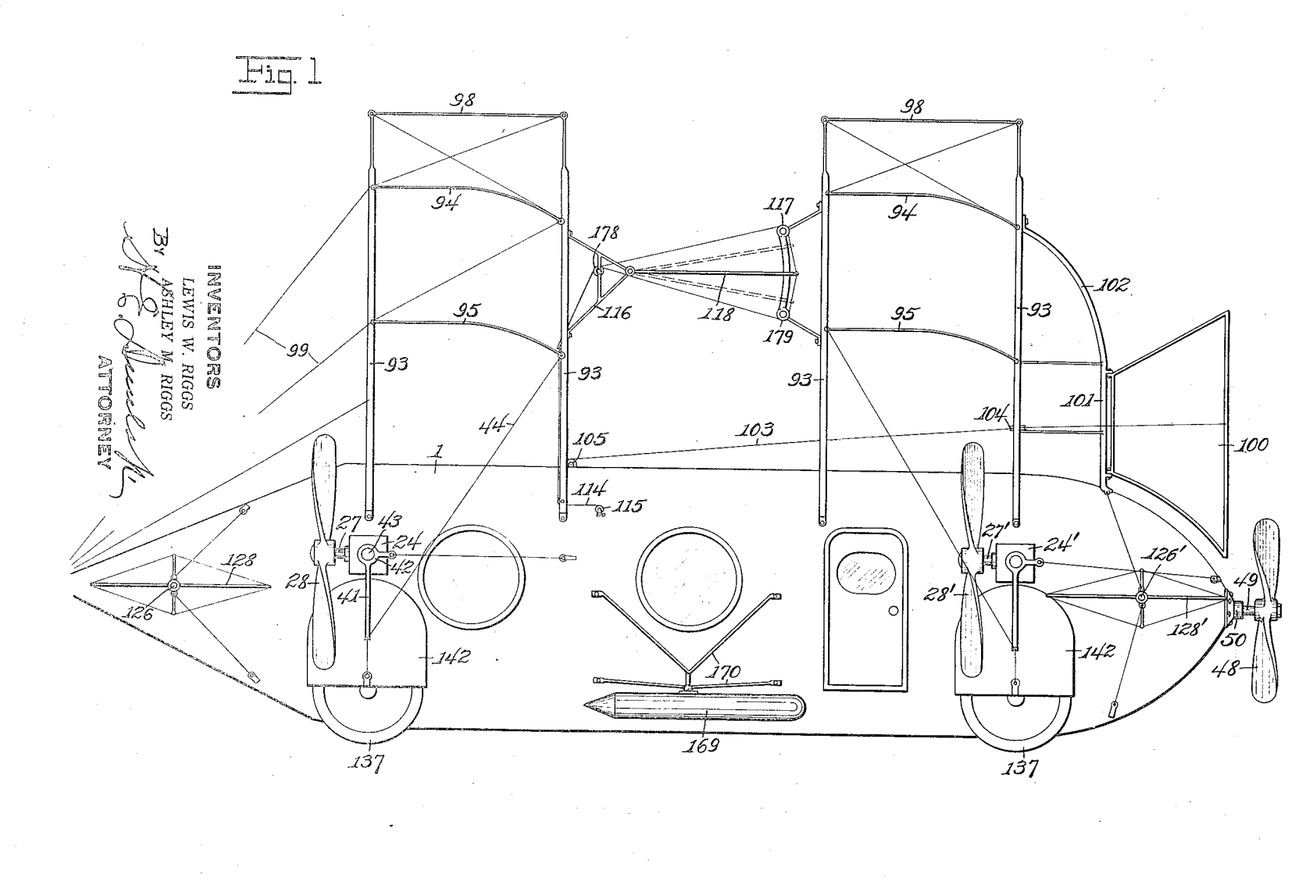
Figure 1 is a side elevation of the invention.
Figure 8:
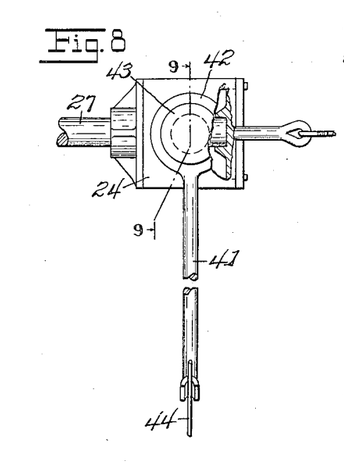
Fig. 8 is an enlarged detail view partially in end elevation and partially in section, illustrating the propeller-shaft boxing.
Figure 9:
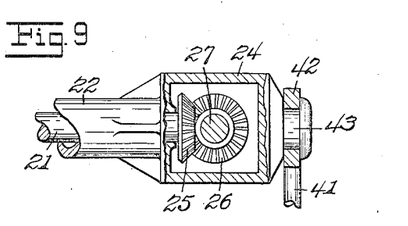
Fig. 9 is a section on line 9—9, Fig. 8.

Each of the tubes 22 carries upon its outer end a boxing 24 into which the adjacent end of the shaft 21 protrudes, said shaft having a bevel gear 25 fixed on said end in operative relation to a similar gear 26 fixed on a short propeller shaft 27 which has its bearings in and projects outward from said boxing, as shown most clearly in Figs. 1 and 8, said propeller shaft 27 having a propeller 28 fixed on its outer end.

Figure 5:
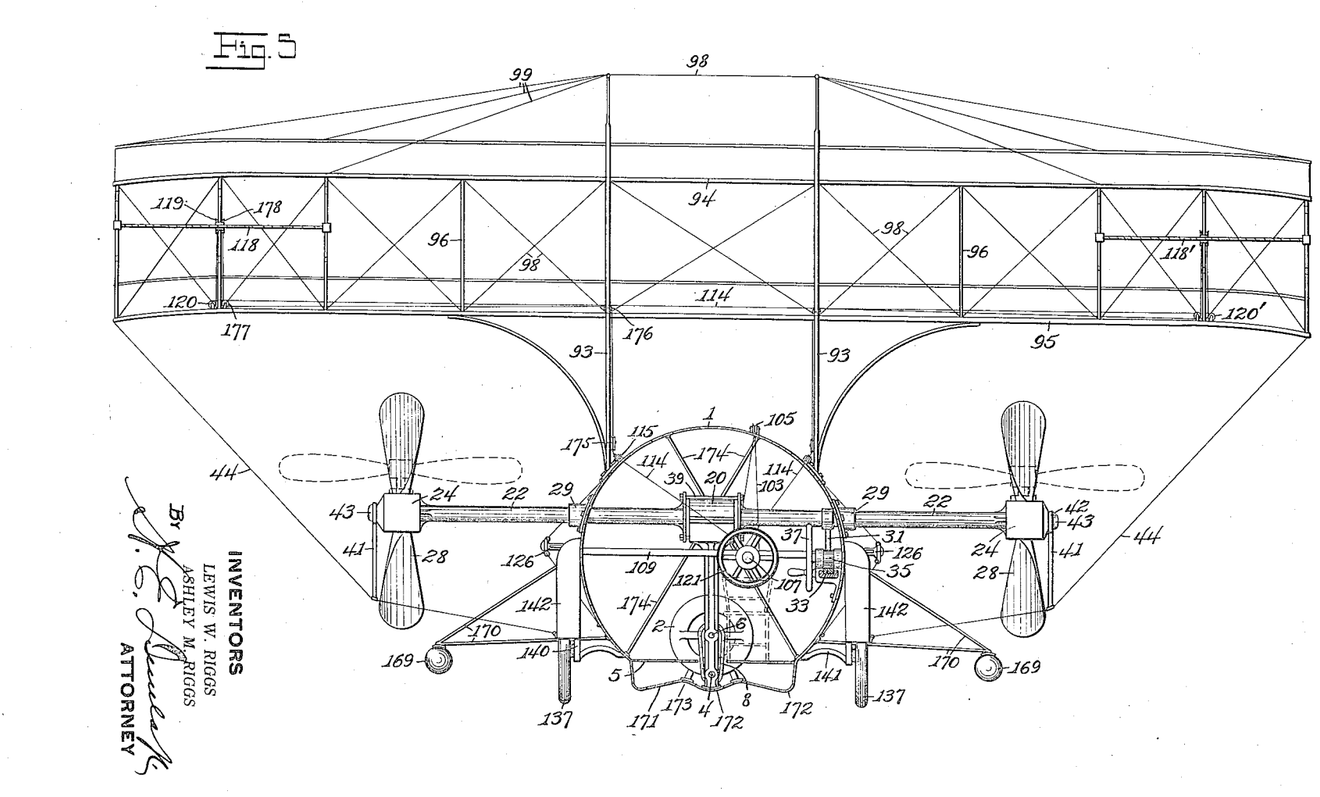
Fig. 5 is a transverse section on line 5—5, Fig. 3.
Figure 7:
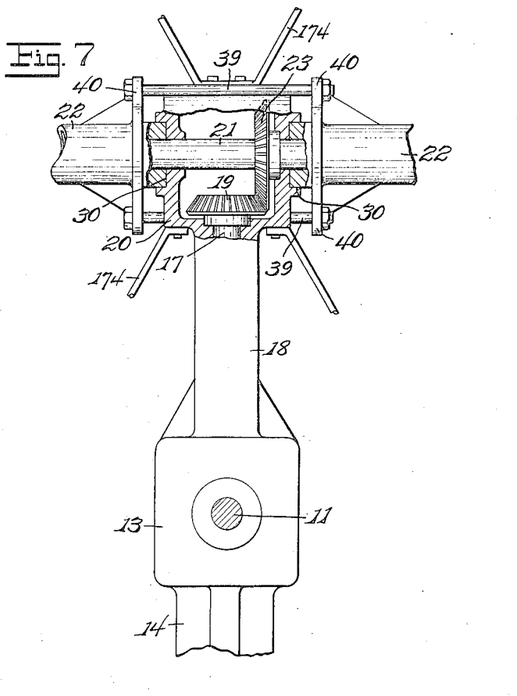
Fig. 7 is a partial section of the same viewed at right angles to the viewpoint in Fig. 6.

The tubes 22 are capable of rotation throughout an arc of 90 degrees for elevating the propeller shafts 27 and propellers 28 from their forward craft-propelling positions, shown in full lines in Figs. 1 and 5, to the upright craft-elevating and lowering positions shown in dotted lines in Fig. 5. Said tubes are rotatable in bearings 29 mounted on the car body and in suitable socket-like bearings 30 formed in the opposite side-walls of the casing 20, as shown in Fig. 7. As a means for rotating said tubes from one operative position to the other, a crank-arm 31 fixed to one of said tubes at a point within the car is pivotally connected to one end of a link 32 having its opposite end pivotally connected to the front end of a horizontally disposed rack-bar 33 which is longitudinally movable through suitable guides 34 carried on the inner side of the car body. Said rack-bar is operatively engaged by a pinion 35 fixed on a short transverse shaft 36 which has a hand-crank or operating wheel 37 fixed thereon at a point within convenient reach of the operator's position, indicated by the chair 38 shown in dotted lines.

The pinion 35 is so proportioned that in a single revolution thereof the rack-bar 33 will be moved the requisite distance to rotate the tubes 22 from one limit of movement to the other, or throughout an arc of 90 degrees. Suitable means is provided for locking said parts in each of their extreme, or operative, positions, said means preferably comprising a pivoted bell-crank lever 79 carried by the rim of the operating wheel 37 and having one arm thereof constituting a complement to a fixed handle 80 carried by said rim and by which said wheel is operated, as shown in Figs. 14, 15, 16 and 17. A pin 81 is pivoted to the opposite end of said bell crank, and is movable through an opening in said rim into and out of a socket 82 provided therefor at a suitable point, as in a part of a supporting bracket 83 upon which said rack-bar is slidable. As is obvious, when it is desired to rotate the tubes 22 from one position to the other, the bell-crank 79 is operated by hand-pressure against the tension of a spring 84 interposed between the hand portion thereof and the handle 80, thus withdrawing the pin 81 for rendering the wheel 37 operative. When the opposite limit of movement is reached, the pin again seats for locking the parts.

Rotary motion imparted to the tube 22 which bears the crank-arm 31 is directly communicated to the other tube, the adjacent ends of said tubes being rigidly connected by means of tie-rods 39 directed through collars, flanges or radially disposed lugs, as 40, formed on said ends, the positions of said rods being such that the latter may have unobstructed movement with respect to the casing 20.

An additional bearing for the outer end of each tube 22 is afforded by an upright supporting member 41 having on its upper end a collar-like bearing 42 in which is rotatably received a short stem 43 carried on the outer face of the boxing 24. In the present embodiment, said supporting member 41 has its lower end seated upon a guy wire 44 stretched between suitable fixed parts of the structure.

Figure 10:
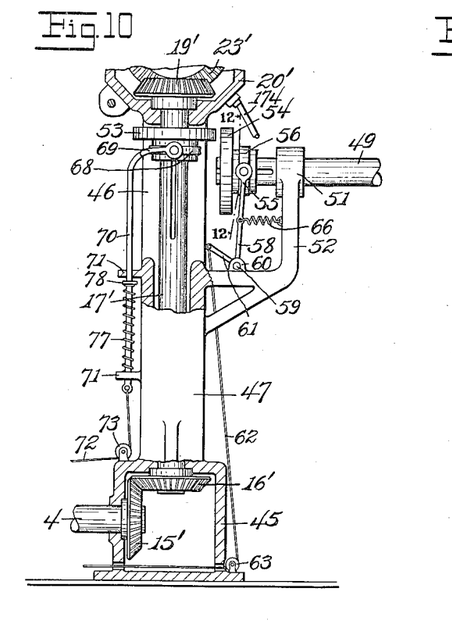
Fig. 10 is an enlarged detail view, partially in section, of the rear gear casing.
Figure 11:
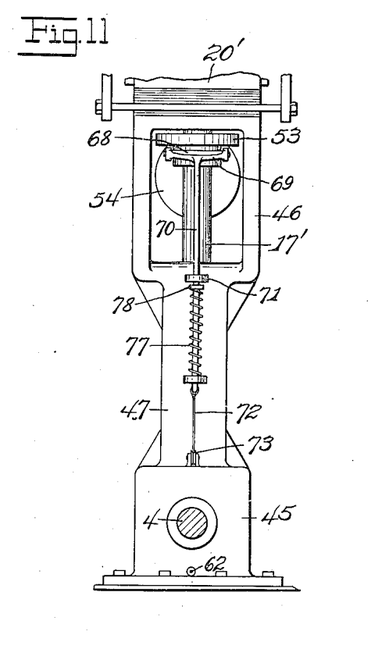
Fig. 11 is a front elevation of the same.

The rear end of the transmission shaft 4 projects into, and is journaled in the walls of, a casing 45 located at an appropriate point within the rear end of the car 1. Fixed on the projecting rear end of said shaft 4 is a bevel gear 15' which meshes with a similar gear 16′ carried on the lower end of an upright shaft 17′ having its lower end journaled in the upper wall of said casing 45, as shown in Fig. 10. The upper end of said shaft 17′ is journaled in the lower wall of a casing 20′ located at the upper end of a yoke 46 which surmounts a hollow pedestal-like member 47 supported by said casing 45 and inclosing the lower body portion of said shaft 17′. Fixed upon the upper end of said shaft 17′ is a bevel gear 19′ in mesh with a similar gear 23′ carried upon a horizontal transverse shaft 21′ which is similar in all respects to the shaft 21 hereinbefore described. Said shaft 21′ operates within oppositely disposed tubes 22′ which carry boxings 24′ on their outer ends. Propeller shafts 27′ carrying propellers 28′ are journaled in said boxings 24′, said shafts being operatively associated with the shaft 21′ in the precise manner of the propeller shafts 27 with the shaft 21, hereinbefore described.

The rotation of the shaft 21′ for elevating and lowering the propellers 28′ is accomplished in the same manner and by the same act that rotates the shaft 21, the rear end of the rack-bar 33 having pivotally connected thereto one end of a link 32′ whose opposite end is pivoted to a crank-arm 31′ carried by the shaft 21′.

A propeller 48 is located in permanent position at the extreme tail end of the car 1, the same being mounted upon a longitudinally disposed shaft 49 journaled in bearings 50 and 51, the former mounted upon the wall of the car at the point penetrated by said shaft and the latter being carried by a rearwardly extending bracket 52 supported by the pedestal 47. While said propeller 48 may be used as an auxiliary to the propellers 28 and 28′ for driving the craft, it is primarily designed for retarding or slowing up the forward movement of the craft, as when it is desired to bring the latter to a stationary position, and for reversing the direction of travel, as when it is necessary to back up slightly to a position over a desired landing place.

Figures 12, 13:
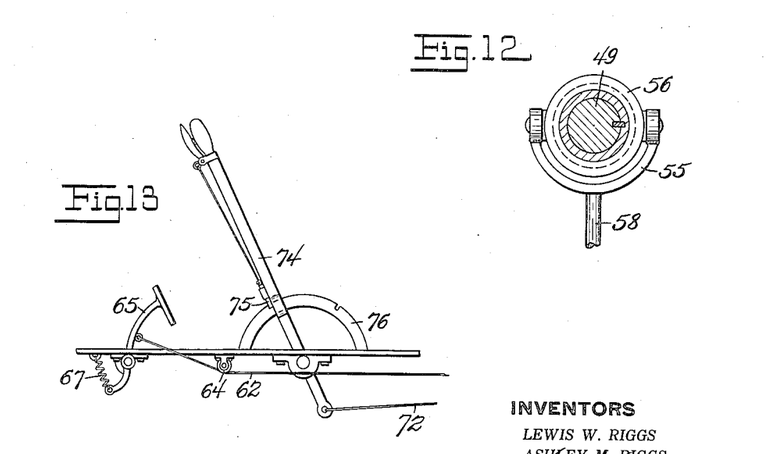
Fig. 12 is an enlarged section on line 12—12, Fig. 10.
Fig. 13 is an enlarged detail view of the levers for controlling the rear or reversing propeller.
Figure 14:
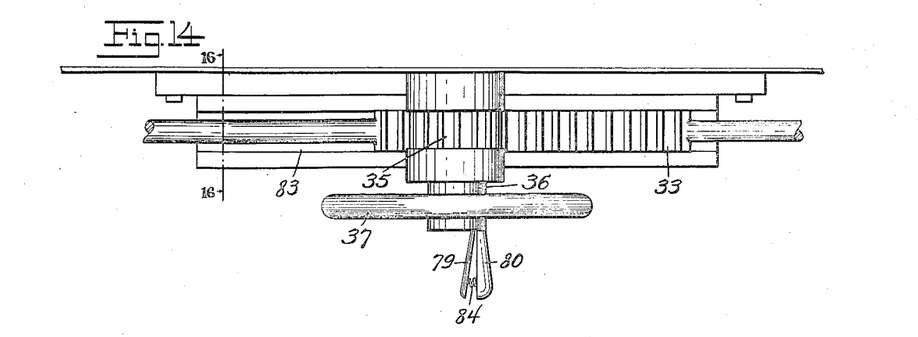
Fig. 14 is an enlarged detail view, in top plan, of a part of the propeller-shifting mechanism.
Figures 15, 16, 17:
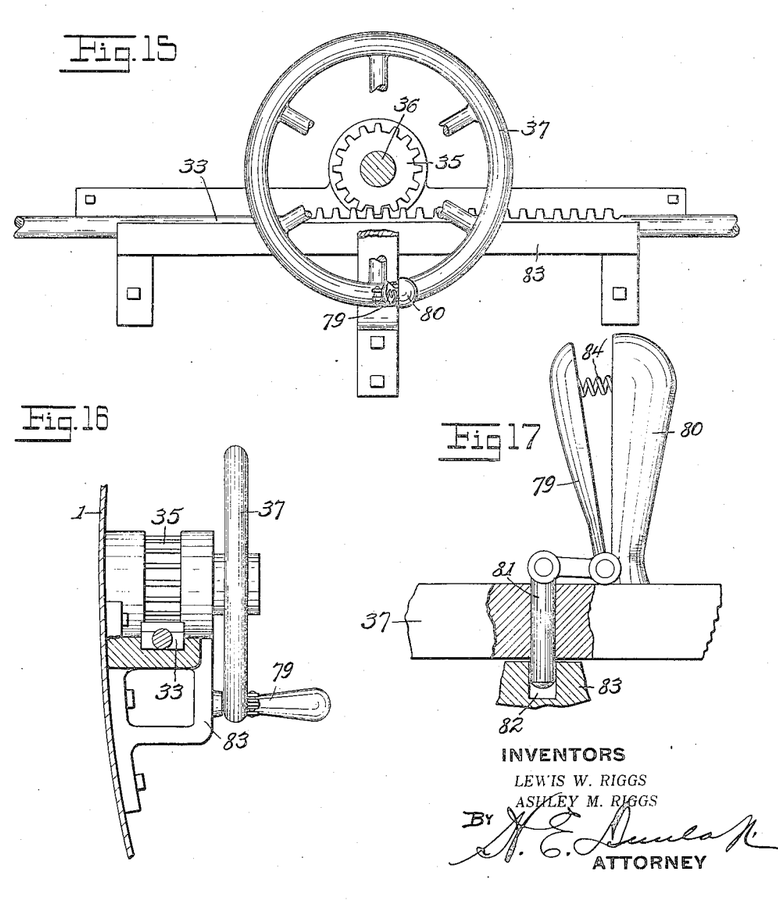
Fig. 15 is a view of the same partly in side elevation and partly in section.
Fig. 16 is a section on line 16—16, Fig. 14.
Fig. 17 is an enlarged detail section of the means for locking the propeller-shifting mechanism.
Figure 18:
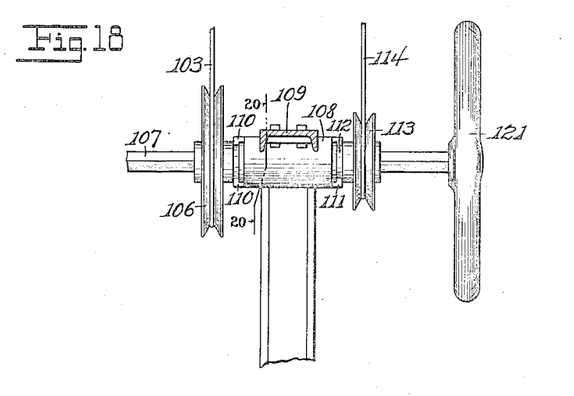
Fig. 18 is an enlarged side elevation of portions of the mechanism for controlling the rudder, dipping planes and stabilizers.
Figure 19:
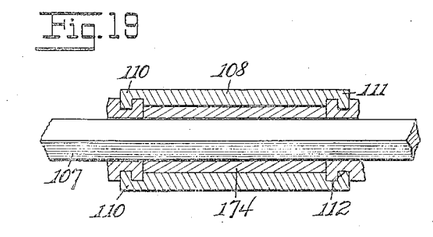
Figs. 19 and 20 are enlarged sections of the same, the section in Fig. 20 being taken on line 20—20, Fig. 18, and that in Fig. 19 being taken on line 19—19, Fig. 20.
Figure 20:
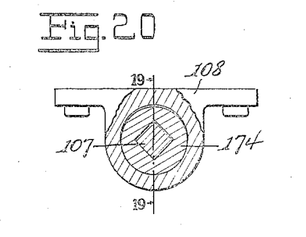

To provide means whereby said propeller 48 may be rendered operative or inoperative and may also be operated for propelling the craft either in a forward or rearward direction as desired, a suitable shiftable gearing is provided. In the present embodiment said gearing comprises friction disks 53 and 54 disposed in planes at right angles to each other, the disk 53 being splined upon the upright shaft 17′ while the disk 54 is splined upon the adjacent end of the shaft 49. A yoke 55 has its terminals pivotally attached to a collar 56 which is rotatable on the hub of the disk 54, as shown in Figs. 10 and 12, and the substantially upright stem 58 by which said yoke is carried has its lower end fixed upon a shaft 59 mounted in bearings 60 located at suitable points, as upon a portion of the bracket 52. An upwardly and forwardly inclined crank-arm 61, also fixed to said shaft 59, has one end of a cable 62 attached to its forward, or free, end, and said cable is thence passed downward to and under a pulley 63, preferably located beneath the floor 5, whence it extends forward over a suitably located pulley 64 and thence upward through the floor and is connected at its front end to a suitably located foot-operated lever 65. It will be obvious, therefore, that when said lever 65 is thrust forward, the disk 54 will, through the intermediacy of the cable 62 and interposed elements, be shifted forward into operative frictional relation to the disk 53 for imparting motion to the shaft 49, said shifting movement being accomplished against the tension of a suitably positioned retractile coil spring 66 whereby said disk 54 is normally maintained in rearwardly thrust, or inoperative, position, and also against the tension of a spring 67 which normally holds said foot lever 65 in rearwardly thrust position.

The friction disk 53 is vertically adjustable on the shaft 17′ both for regulating the speed of the shaft 49 and for controlling the direction of rotation of said shaft, as will be readily understood by all skilled mechanics. The means for shifting the position of said disk includes a collar 68 which is loosely seated in a channel provided therefor in the hub of said disk 53. Pivotally connected to said collar are the terminals of a horizontally disposed yoke 69 having a vertical stem 70 operating through lug-like guides 71 carried by the pedestal 47. A cable 72 having one end attached to the lower end of said stem 70 is passed thence downward to and under a suitably located pulley 73 and thence forward and is connected at its opposite end to the lower end of a pivoted hand-operated lever 74 located at a point within convenient reach of the operator. Suitable means, as a dog 75 for engagement with a notched rack segment 76, is provided for maintaining said lever in adjusted position, as shown in Fig. 13. As is apparent, rearward movement of the hand lever 74 accomplishes downward shifting movement of the friction disk 53 against the tension of a coil spring 77 which is interposed between one of the lugs 71 and a collar 78 fixed on the vertically movable stem 70, said spring being designed to normally hold said friction disk elevated to the limit of its upward movement.

The clutches 7 and 12, whereby the gearings for driving the propellers 28′ and 28, respectively, are operatively connected to the engine shaft 3, are preferably coupled together in such manner that they may be simultaneously actuated. Pivoted to the collar of the clutch 7 is a yoke 85 having an upwardly extending arm 85ª pivotally connected at a fixed point above said clutch, as to a bracket 86 located upon a stationary supporting member 87. A downwardly extending arm 85ᵇ carried by said yoke has pivoted thereto the rear end of a rod 88 which has its front end pivoted to the lower end of the depending arm 89ª of a yoke 89 which is pivoted to the collar of the clutch 12. Said arm 89ª is pivoted intermediate its ends upon a fixed bracket, as 90. A foot-operated lever 91 is pivoted at a suitable point convenient to the operator, and pivotally connected to said lever is the rear end of a rod 92 which has its front end connected in like manner to the arm 85ᵇ intermediate the ends of the latter. It will thus be seen that foot pressure applied to the lever 91 will, through the intermediate mechanism described, act to simultaneously retract the clutches 7 and 12 for rendering the propellers 28 and 28′ inoperative. A suitably disposed spring or springs is employed for maintaining said lever 91 and the clutches 11 and 12 in initial position. As such springs may be readily located by any skilled mechanic, the same have been omitted from the drawings for the sake of clearness.

Mounted upon a series of stationary vertical standards or mast-like frame members 93 carried upon the top of the car body 1 are two sets of supporting planes, one set being located over the forward part and the other over the rear part of the cylindrical portion of said body, each set comprising an upper plane 94 and a lower plane 95, both of camber form and held in spaced relation by vertical struts 96 and crossed diagonal wire ties 97. Braces 98 and wire stays 99 are so disposed as to afford rigid support to the planes and plane-carrying members.

Figure 2:
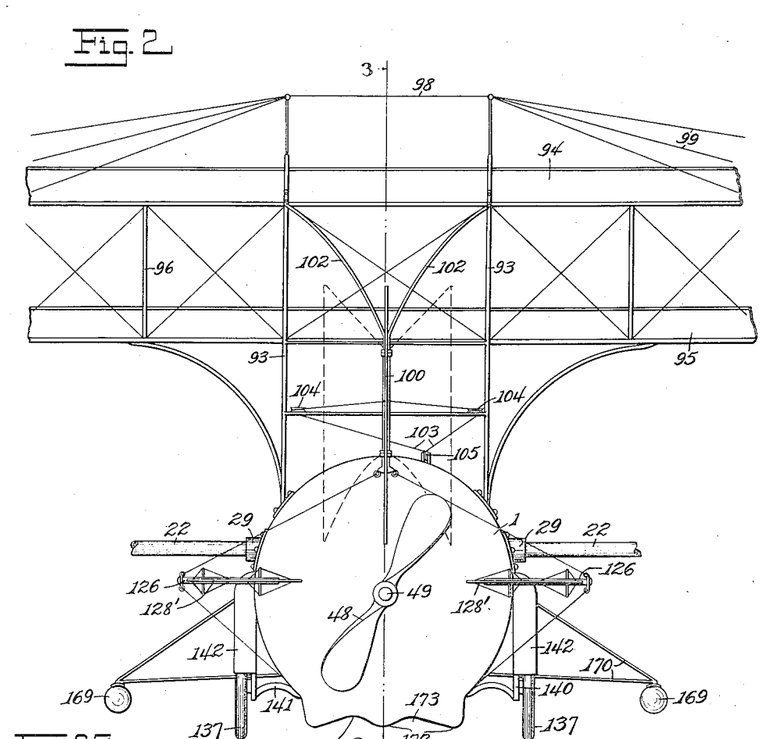
Fig. 2 is a partial rear end elevation of the same.
Figure 3:
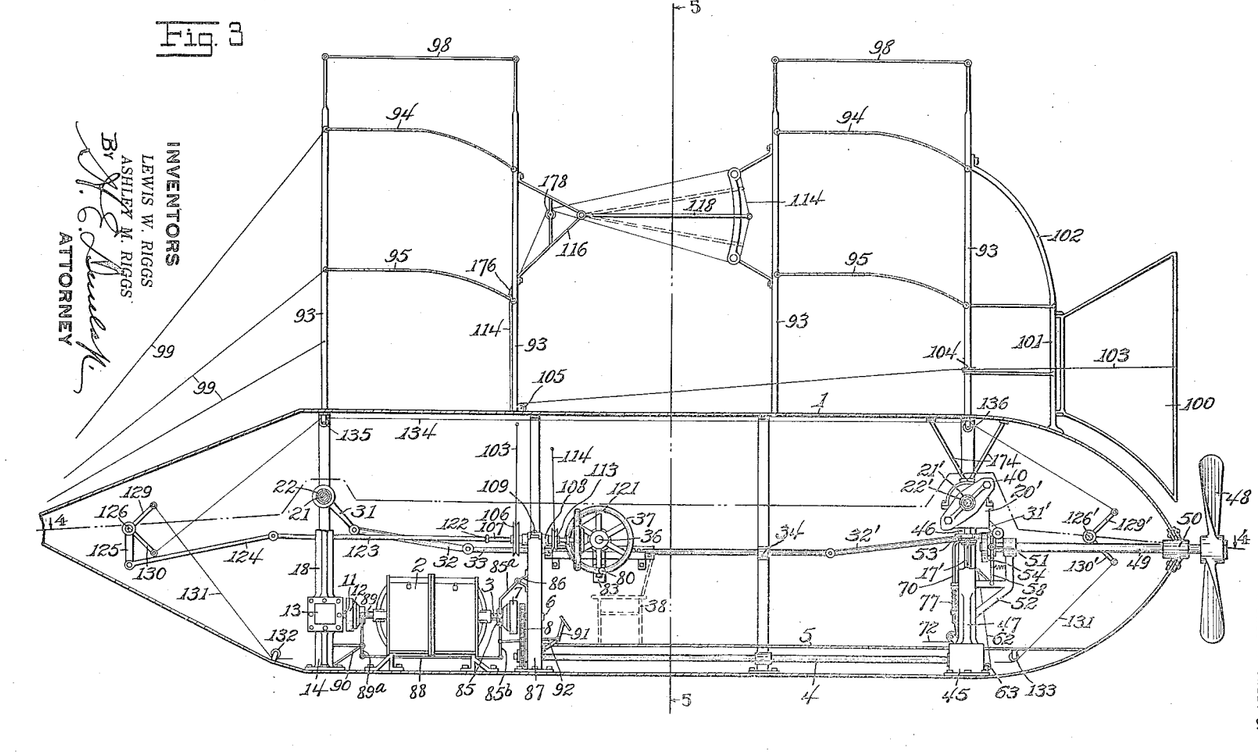
Fig. 3 is a vertical longitudinal section on the line 3—3, Fig. 2.
Figure 4:
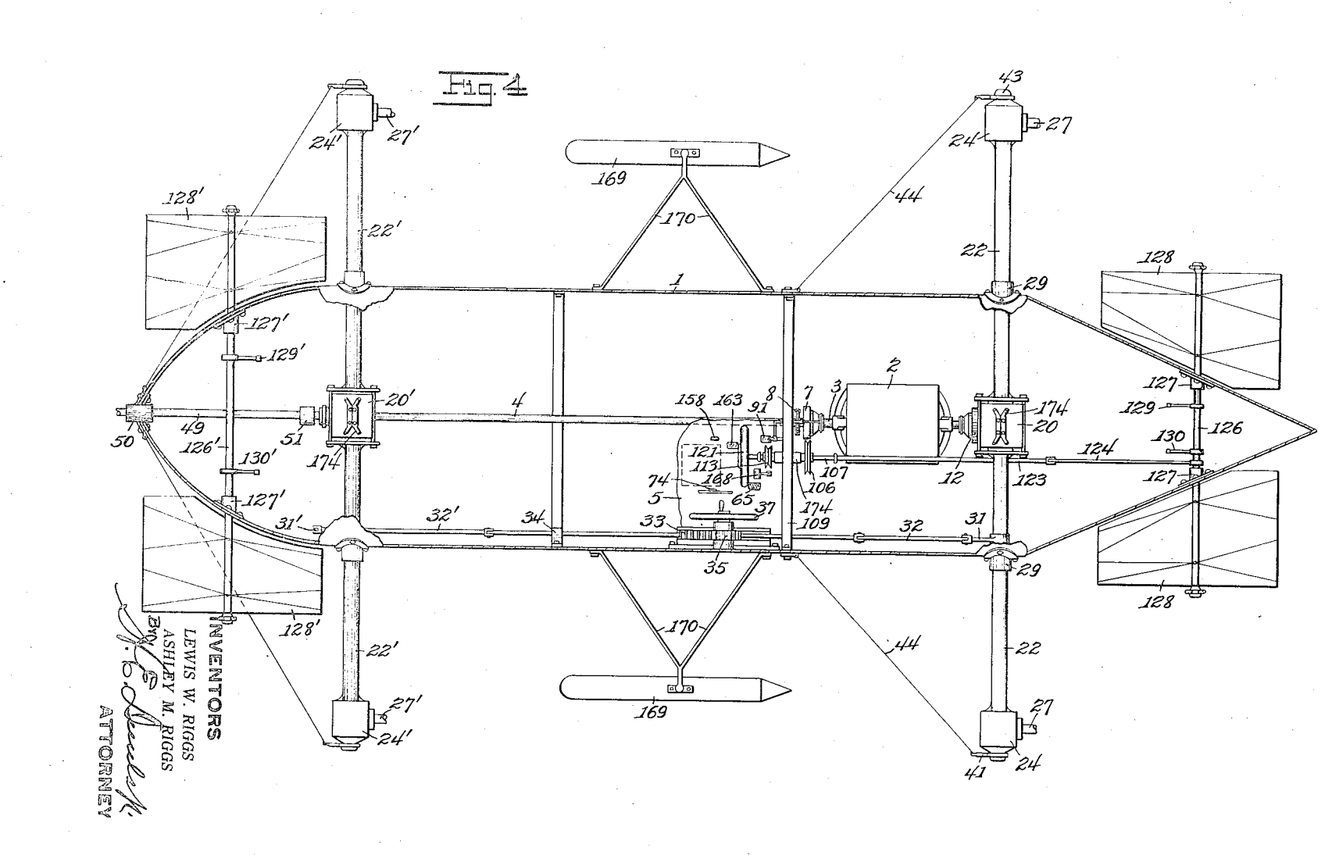
Fig. 4 is a horizontal section taken substantially on the line 4—4, Fig. 3.

A rudder 100 is disposed vertically over the rear end of the car 1, being pivotally mounted upon a vertical support 101 having its lower end mounted on the car body and having its upper end rigidly held by upwardly and laterally inclined brace-like members 102 attached to the adjacent standards or frame members 93. Said rudder is controlled by means of an endless cable 103 which is disposed in straddling relation to the rudder and is fixed at one point thereof to the rear edge of said rudder, as shown in Figs. 1, 2 and 3. The opposite sides of said cable extend forward and laterally to and about suitably located pulleys 104, thence convergently incline to and over a pulley or pulleys 105 located at suitable points, and thence extend downward through the top of the car to and about a pulley 106 the hub of which has a squared eye therethrough in which is received a shaft 107, square in cross section, as is clearly shown in Figs. 18, 19, 20 and 21.

The shaft 107 is longitudinally slidable through a cylindrical sleeve 174 which is rotatably mounted in a supporting bracket 108 which is rigidly mounted upon a frame member, as 109, disposed transversely across the car directly in front of the operator's station. The inturned terminals of a pair of oppositely disposed lugs 110 carried by the bracket 108 are received in an annular channel provided in the hub of the pulley 106 whereby the latter is held against longitudinal movement while being freely rotatable with respect to the bracket.

Inturned terminals of lugs 111, similar to the lugs 110, are carried by the opposite end of the bracket 108, the same being received in an annular channel 112 provided in the hub of a pulley 113, similar to the pulley 106, carried by the shaft 107. An endless cable 114 passed around said pulley 113 has its opposite sides crossed over said pulley, one side being extended upward through the top of the car to and over a pulley, as 115, thence to and beneath a pulley 175 located at a suitable point, as on one of the masts 93 carrying the foremost supporting planes, thence upward over a pulley 176 carried by said mast, thence horizontally to and under a pulley 177, thence upward to and over a pulley 178 carried by a bracket-like supporting member 116 which is mounted upon struts adjacent to one end of the forward supporting planes 94 and 95, thence rearward to and over a pulley 117 located above the free rear end of a stabilizing plane 118 which is pivoted at its opposite end on said bracket 116, thence downward to said free end of the stabilizer to which it is fixed, thence downward to and under a pulley 179, located below the free end of said stabilizer, thence rearward to and over a pulley 119 carried by the bracket 116, thence downward to and about a pulley 120, whence it extends horizontally to a pulley 120′ located adjacent to the opposite ends of said supporting planes 94 and 95, whence it passes in a reverse direction about a series of pulleys, similar to those just described, and back to the starting point at the pulley wheel 113, being connected to a stabilizer 118′, similar to stabilizer 118, located at the end opposite stabilizer 118. The arrangement of the pulleys is such that when the shaft 107 is turned in one direction, the free end of one stabilizer is elevated and that of the other lowered, and vice versa, reverse movements being imparted simultaneously to said stabilizers for controlling the balance of the craft, as is clearly illustrated in Fig. 28. The arrangement of pulleys described is shown for illustrative purposes only, it being apparent that the stabilizers may be controlled in a different manner, or by different means from that shown and described.

A hand wheel 121 is fixed on the rear end of the shaft 107 in a position close to the operator's station, by means of which said shaft may be rotated for shifting the position of the rudder 100 and for simultaneously shifting the position of the stabilizers 118 and 118'.

Figure 28:
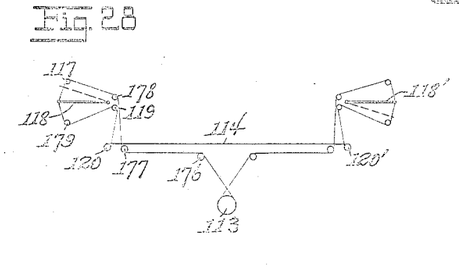
Fig. 28 is a diagrammatic view illustrating the cable and pulley arrangement of the stabilizer control.

As is obvious from an inspection of Fig. 28, the arrangement of the controlling means for the stabilizers is such that the latter are simultaneously actuated and that they assume reversely inclined positions. It will further be noted that the stabilizers are actuated by the same movement which swings the rudder, and that the direction of inclination imparted to the stabilizers is dependent upon the direction of shifting movement imparted to the rudder.

Figure 21:
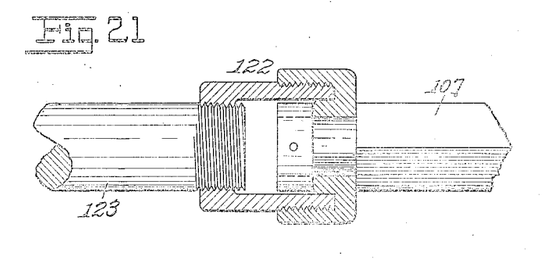
Fig. 21 is an enlarged detail section of the swivel joint between parts of the controlling mechanism for the dipping planes.

The shaft 107 has swivel connection at a point 122, as shown in Fig. 21, with the rear end of a horizontal longitudinally disposed rod 123, the front end of which has pivoted thereto the rear end of a link 124. The front end of said link is pivoted to a crank arm 125 carried by a horizontal transverse shaft 126 which is located near the extreme front end of the car and which is journaled in bearings 127 mounted on the car walls 1. The opposite ends of said shaft 126 project outwardly from the car and each has rigidly mounted thereon a dipping plane 128. Said dipping planes normally occupy horizontal positions and are designed to be swung slightly forward or rearward to inclined dipping positions, according as it is desired to cause the front end of the car to rise or lower. As is obvious, rotary movement is imparted to the shaft 126 by longitudinal movement of the shaft 107, the hand wheel 121 being drawn toward or pushed away from the operator according to the direction of the inclination which it is desired to impart to the dipping planes 128.

Dipping planes 128', similar to the planes 128, are also located adjacent to the rear end of the craft, the same being mounted upon the projecting ends of a transverse shaft 126' directed horizontally through the car near the extreme rear end of the latter and journaled in bearings 127'.

Due to the fact that it is advantageous to swing the dipping planes 128' in a direction reverse to that at which the planes 128 are swung, causing the front ends of the former to dip downward when the front ends of the latter incline upward, and vice versa, suitable means is interposed between the fore and aft dipping planes whereby the dipping movement of the forward planes in either direction is directly communicated to the rear planes for producing the required dip of the latter. In the present embodiment, said means includes two crank arms 129 and 130, carried by the shaft 126, the former being inclined upwardly and rearwardly and the latter being inclined downwardly and rearwardly from said shaft; and also includes two similarly disposed crank arms 129' and 130' carried by the shaft 126'. A cable 131 attached at one end to the crank arm 129 inclines thence downwardly and rearwardly to and under a pulley 132, thence horizontally underneath the floor of the car to and under a similar pulley 133 located near the rear end of the car, and thence upwardly and rearwardly and has its opposite end attached to the crank arm 130'. A second cable 134 has one end attached to the crank arm 130 and thence inclines upward and rearward to and over an overhead pulley 135, thence horizontally to and over a similar pulley 136, and thence inclines downward and rearward and has its opposite end attached to crank arm 129'. Thus, as is apparent, a forward shifting movement of the square shaft 107 accomplishes the upward inclination of the planes 128 and the downward inclination of the planes 128', while a reverse movement of said planes is accomplished by rearward shifting of said shaft.

Figure 22:
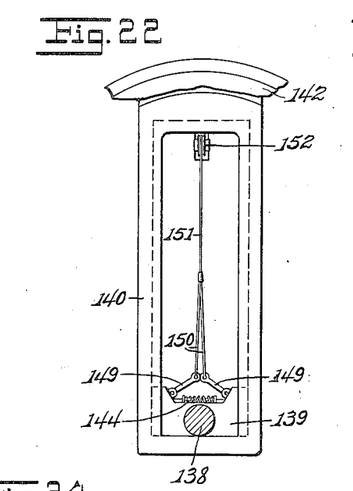
Fig. 22 is a side elevation of a portion of the running-gear elevating mechanism.
Figure 23:
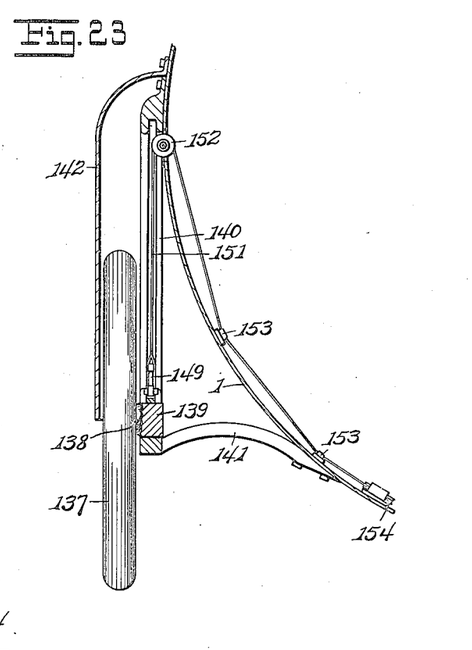
Fig. 23 is a section of the same taken at right angles to the viewpoint in Fig. 22.
Figure 24:
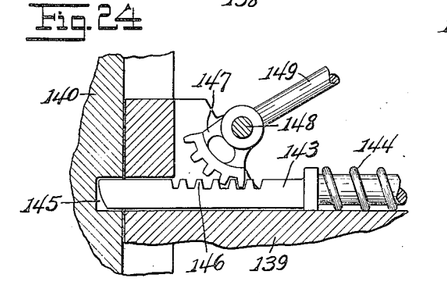
Fig. 24 is an enlarged detail section showing the locking means whereby the ground-engaging wheels are held in place.
Figure 25:
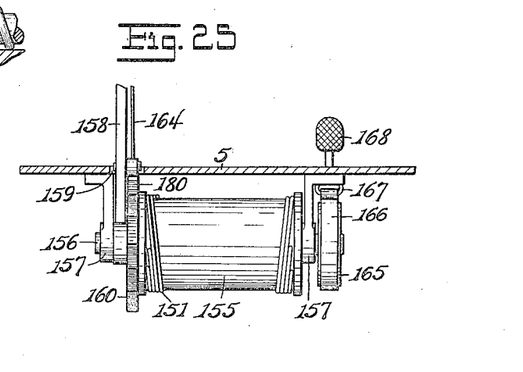
Fig. 25 is a rear elevation of the drum and associated wheel elevating and lowering mechanism.
Figure 26:
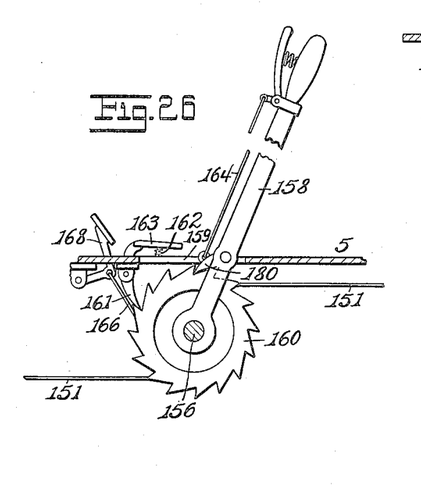
Fig. 26 is a side elevation of the same.
Figure 27:
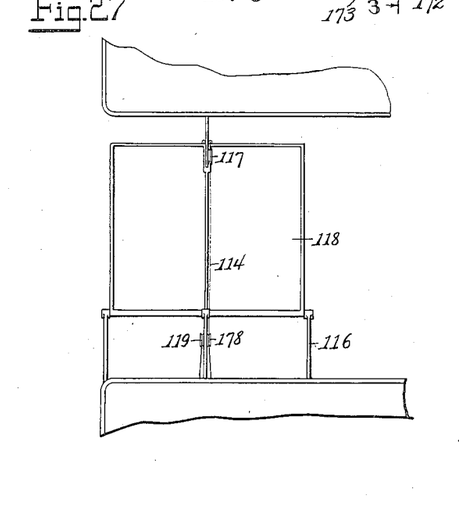
Fig. 27 is a top plan view of a stabilizer; and—

A running gear comprising an equipment of wheels 137 located at opposite sides of the car body, fore and aft, is provided for traveling on the ground when starting and on alighting. Each of said wheels is rotatably mounted on a spindle 138 carried by a block 139 which is vertically movable in an upright guide 140, shown in Fig. 22, which has its upper end rigidly mounted on the body 1. The lower end of said guide is braced from said body by a substantially horizontal member 141, as shown in Fig. 23. As is obvious, the wheels are designed to be elevated within a suitable shield-like casing 142, as when the machine is to be operated on the water. Said wheels normally occupy lowered operative positions, as shown in Figs. 22 and 23, each of the blocks 139 being locked against movement by means of a pair of horizontally alined oppositely-disposed latch-bolts 143 carried by said block, which bolts are normally held outwardly thrust by a suitable spring or springs, as 144, with their ends received in sockets 145 provided therefor in the opposite sides of the guide 140. A series of rack-teeth 146 is provided in the upper face of each locking bolt 143, the same being engaged by a rack-segment 147 which is pivoted on a pivot pin 148 carried by a suitable part of the block 139. Formed integral with the rack-segment 147 and normally occupying an inwardly and upwardly inclined position, as shown in Figs. 22 and 24, is an arm 149, the arms of oppositely disposed segments having attached thereto twin ends 150 of a cable 151 which extends vertically upward to and over a pulley 152 located at the upper end of the guide 140. From said pulley said cable passes through the wall 1 of the car and thence is directed through suitably located dead eyes 153 to a pulley 154, whence it passes to and about a drum 155 fixed on a shaft 156 journaled in bearings 157 located beneath the floor close to the operator's station. A hand lever 158 extends through a slot 159 provided in the floor and is loosely mounted on said shaft 156. A pivoted pawl 180 carried by said lever is normally disposed in operative relation to a ratchet wheel 160, as shown in Figs. 25 and 26. Forward movement imparted to said lever 158 acts through said pawl and ratchet to rotate the drum forward for simultaneously winding up the various cables 151 whereby the various locking bolts 143 are withdrawn and the wheels 137 are elevated within the casings 142. A second pawl 161 is pivoted at a suitable point for engaging the ratchet and maintaining said drum against rearward rotation while the lever 158 is being drawn back to secure a new hold, said pawl being yieldingly held seated by a spring 162 disposed beneath a foot pedal 163 which is adapted to be depressed for rendering said pawl inoperative, as when it is desired to release the drum to allow the wheels 137 to gravitate to their normal positions. As is obvious, the pawl 180 must be withdrawn at the same time as the pawl 161 for releasing the drum. Such withdrawal of said pawl 180 is preferably accomplished by means of a lever-operated rod 164 connected to said pawl, as shown in Fig. 26.

To prevent the wheels 137 from dropping violently when the ratchet is released, a suitable brake is employed, the same including a brake wheel 165 fixed on one end of the shaft 156 and a friction band 166 passed about said brake-wheel, one end of said band being rigidly attached, as to a suitably located ring 167, as shown in Fig. 25, and the opposite end attached to a foot-operated lever 168, as shown in Fig. 26.

To facilitate the maintenance of proper equilibrium when the craft rides upon the water, suitable pontoon floats 169 are disposed at opposite sides of the car body, the same being connected to said body by suitably disposed rods or braces, as 170. To further facilitate travel upon the surface of the water, the under side, or bottom, 171, of the body 1 is of sinuous form in cross section, as shown in Figs. 2 and 5, providing a plurality of alternate longitudinal ribs 172 and channels 173 which are designed to cause the craft to pursue a straight course over the water and tend to hold the same in upright position.

Figure 6:
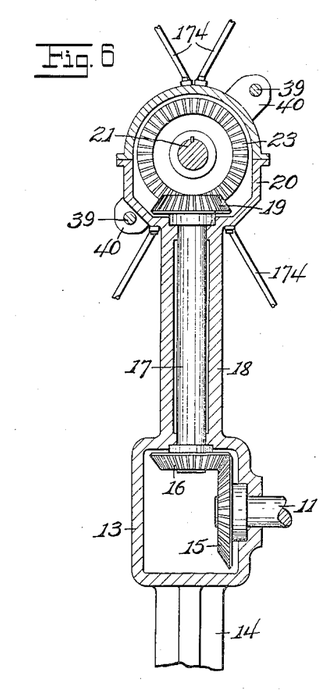
Fig. 6 is an enlarged vertical section of the forward gear casing.

For effectually bracing the casings 20 and 20' with respect to the body of the car, a plurality of radially disposed braces or struts 174 is interposed between said casings and said body, as is most clearly shown in Figs. 5, 6 and 7.

In practice, when it is desired that the craft shall rise vertically, as at the start of a flight, the propeller shafts 27 and 27' are raised to vertical positions. When a desired elevation has been reached, said shafts are lowered to horizontal positions, thus disposing the propellers 28 and 28' for propelling the craft in the usual manner.

What is claimed is—

1. In an aeroplane, the combination with a car and suitably arranged supporting planes, of a plurality of propellers located at opposite sides of the car, means for driving said propellers, means for swinging said propellers from horizontal to vertical positions, and vice versa, a propeller located rearward of said car, gearing for the last-mentioned propeller, means for shifting said gearing to and from operative positions, means for controlling the direction of rotation of said last-mentioned propeller, a movable stabilizing plane located laterally with respect to each side of said car, and means for simultaneously inclining said stabilizing planes in oppposite directions.

2. In an aeroplane, the combination with a car and suitably arranged supporting planes, of a plurality of propellers located at opposite sides of the car, means for driving said propellers, means for swinging said propellers from horizontal to vertical positions, and vice versa, a propeller located rearward of said car, gearing for the last-mentioned propeller, means for shifting said gearing to and from operative positions, means for controlling the direction of rotation of said last-mentioned propeller, a movable stabilizing plane located laterally with respect to each side of said car, means for simultaneously inclining said stabilizing planes in opposite directions, a rudder, and means operable simultaneously with the controlling means for the stabilizer planes whereby said rudder is controlled.

3. In an aeroplane, a car body, two pairs of supporting planes located over said body, one forward and one aft of said body, each pair comprising an upper and a lower plane, a plurality of propellers shiftable from horizontal to vertical positions, and vice versa, means for driving said propellers, a rudder, a pair of shiftable stabilizing planes located between said pairs of supporting planes, one at each side of said body, means for simultaneously shifting said rudder and said stabilizing planes, the plane-shifting means being arranged to incline said planes in reverse directions.

4. In an aeroplane, a car body, two pairs of supporting planes located over said body, one forward and one aft of said body, each pair comprising an upper and a lower plane, a plurality of propellers shiftable from horizontal to vertical positions, and vice versa, means for driving said propellers, a manually operated rotatable shaft, a rudder, means connecting said shaft and said rudder whereby the latter is controlled by rotation of the former, a pair of shiftable stabilizing planes located between said pairs of supporting planes, one at each side of said body, means connecting said shaft and said stabilizing planes whereby the latter are controlled by rotary movement of the former, the last-mentioned means being arranged to simultaneously incline said stabilizing planes in reverse directions according to the direction of movement given said shaft.

In testimony whereof we affix our signatures in presence of two witnesses.

LEWIS W. RIGGS.
ASHLEY M. RIGGS.

Witnesses:
H. E. DUNLAP,
W. F. KEEFER.